United States Patent
Stratton et al.

(10) Patent No.: US 8,140,239 B2
(45) Date of Patent: Mar. 20, 2012

(54) SLIPPAGE CONDITION RESPONSE SYSTEM

(75) Inventors: Kenneth Lee Stratton, Dunlap, IL (US);
Brian Mintah, Washington, IL (US);
Gary Edward Hull, Germantown Hills,
IL (US); James Decker Humphrey,
Decatur, IL (US); Bryan J. Everett,
Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 593 days.

(21) Appl. No.: 12/314,826

(22) Filed: Dec. 17, 2008

(65) Prior Publication Data

US 2010/0152942 A1    Jun. 17, 2010

(51) Int. Cl.
*G06F 19/00* (2006.01)
*G05D 1/00* (2006.01)

(52) U.S. Cl. ............ 701/82; 701/50; 701/450; 701/461; 701/482; 701/532; 340/989

(58) Field of Classification Search .................. None
See application file for complete search history.

(56) References Cited

U.S. PATENT DOCUMENTS

| | | |
|---|---|---|
| 5,436,839 A | 7/1995 | Dausch et al. |
| 5,531,122 A | 7/1996 | Chatham et al. |
| 5,646,844 A | 7/1997 | Gudat et al. |
| 5,736,939 A | 4/1998 | Corcoran |
| 5,956,250 A | 9/1999 | Gudat et al. |
| 6,064,926 A | 5/2000 | Sarangapani et al. |
| 6,161,071 A * | 12/2000 | Shuman et al. .......... 701/48 |
| 6,173,215 B1 | 1/2001 | Sarangapani |
| 6,313,758 B1 | 11/2001 | Kobayashi |
| 6,336,051 B1 | 1/2002 | Pangels et al. |
| 6,442,456 B2 | 8/2002 | Burns et al. |
| 6,445,983 B1 | 9/2002 | Dickson et al. |
| 6,470,271 B2 | 10/2002 | Matsunaga |
| 6,484,089 B1 | 11/2002 | Millington |
| 6,636,807 B1 | 10/2003 | Glasmacher et al. |
| 6,711,838 B2 | 3/2004 | Staub et al. |
| 6,728,608 B2 | 4/2004 | Ollis et al. |
| 6,732,024 B2 | 5/2004 | Wilhelm Rekow et al. |
| 6,845,311 B1 | 1/2005 | Stratton et al. |
| 6,895,310 B1 | 5/2005 | Kolls |
| 6,996,462 B2 | 2/2006 | Heilmann et al. |
| 6,996,464 B2 | 2/2006 | Sorrells |

(Continued)

OTHER PUBLICATIONS

U.S. Appl. No. 12/314,827, entitled "Slippage Condition Response System," filed Dec. 17, 2008 (25 pages).

(Continued)

*Primary Examiner* — Michael J. Zanelli
(74) *Attorney, Agent, or Firm* — Finnegan, Henderson, Farabow, Garrett & Dunner LLP

(57) ABSTRACT

A slippage condition response system for a first machine of a plurality of machines is disclosed. The response system may have a sensing system configured to sense a parameter indicative of a slippage condition of the first machine. Additionally, the response system may have a locator configured to sense a parameter indicative of a location of the first machine. The response system may also have a transmitter. In addition, the response system may have a controller, which may be in communication with the sensing system, the locator, and the transmitter. The controller may be configured to monitor the location of the first machine. The controller may also be configured to monitor the parameter indicative of a slippage condition of the first machine. Additionally, the controller may be configured to transmit to an offboard system at least one location where the first machine experienced a slippage condition.

18 Claims, 4 Drawing Sheets

U.S. PATENT DOCUMENTS

| | | | |
|---|---|---|---|
| 7,272,474 | B1 | 9/2007 | Stentz et al. |
| 2003/0040849 | A1 | 2/2003 | Hathout et al. |
| 2003/0114980 | A1 | 6/2003 | Klausner et al. |
| 2004/0107042 | A1* | 6/2004 | Seick .......................... 701/117 |
| 2004/0122580 | A1 | 6/2004 | Sorrells |
| 2005/0024492 | A1 | 2/2005 | Schaefer et al. |
| 2005/0075760 | A1 | 4/2005 | Moisel et al. |
| 2006/0025897 | A1 | 2/2006 | Shostak et al. |
| 2006/0089766 | A1 | 4/2006 | Allard et al. |
| 2006/0149425 | A1 | 7/2006 | Davis |
| 2007/0040705 | A1* | 2/2007 | Yoshioka et al. ............. 340/988 |
| 2008/0027590 | A1 | 1/2008 | Phillips et al. |
| 2008/0065290 | A1 | 3/2008 | Breed et al. |
| 2010/0004838 | A1 | 1/2010 | Georgis et al. |

OTHER PUBLICATIONS

U.S. Appl. No. 12/213,934, entitled "Worksite Zone Mapping and Collision Avoidance System," filed Jun. 26, 2008 (29 pages).

U.S. Appl. No. 11/974,240, entitled "Systems and Methods for Improving Haul Road Conditions," filed Oct. 12, 2007 (36 pages).

U.S. Appl. No. 11/897,736, entitled "Performance-Based Haulage Management System," filed Aug. 31, 2007 (32 pages).

U.S. Appl. No. 12/008,780, entitled "System and Method for Adjusting Machine Parameters," filed Jan. 14, 2008 (30 pages).

\* cited by examiner

SLIPPAGE CONDITION RESPONSE SYSTEM

TECHNICAL FIELD

The present disclosure relates generally to a response system and, more particularly, to a slippage condition response system.

BACKGROUND

Machines such as, for example, on and off-highway haul trucks, and other types of heavy equipment are used to perform a variety of tasks. Some of these tasks involve traveling between two or more locations. This traveling can include traversing one of many possible paths, each path including certain roadways. These roadways may be rendered unpredictable by weather conditions, usage patterns, machine load losses, natural disasters, tectonic shifts, mud slides, rock slides, and/or other deteriorative events and/or processes. Roadways that are rendered unpredictable may have unpredictable portions, which may include, for example, ice, mud, sand, loose gravel, or standing water. These unpredictable portions may increase time and/or costs associated with traveling between the two or more locations. For example, a machine may traverse a portion of a roadway, find that the roadway includes standing water, and be re-routed along another one of the possible paths. This re-routing may increase time and/or costs associated with traveling between the two or more locations. The unpredictable portions may also disable the machine. For example, the machine may slip, get stuck, deplete its energy (e.g., fuel or electric charge), crash, or otherwise be disabled by the unpredictable portions.

One way to minimize the effect of unpredictable portions of roadways is to facilitate communications between machines and/or remote offices regarding the unpredictable portions. An example of facilitating communications between machines and/or remote offices is described in U.S. Patent Application Publication No. 2004/0122580 (the '580 publication) by Sorrells published on Jun. 24, 2004. The '580 publication describes a control module, which determines if a machine is operating on a road having an adverse road condition. Adverse road conditions include soft underfoot conditions, steep grades, and potholes. Additionally, the '580 publication describes updating a site map stored in the control module or a remote office to show the adverse road condition. The '580 publication also describes using the control module or the remote office to notify an operator of the machine that the machine is approaching the adverse road condition. Additionally, the '580 publication describes using the control module or the remote office to dispatch a machine to the location of the adverse road condition for the purpose of correcting the adverse road condition.

The '580 publication addresses neither unpredictable portions of roadways that cause machines to experience slippage conditions (hereafter "slippage condition portions") nor the problems associated with slippage condition portions. As used herein, a slippage condition is an event that is objectively detected through analysis of sensed parameters. For example, a slippage condition portion may cause a slippage condition that may or may not affect a heading and/or location of a machine. Specifically, the machine may fishtail, irregularly accelerate (accelerate slower than expected), or irregularly decelerate (decelerate slower than expected). Alternatively or additionally, a slippage condition portion may cause a slippage condition that causes one or more traction devices of a machine to rotate irregularly (faster or slower than expected).

The present disclosure is directed to overcoming one or more of the problems set forth above and/or other problems in the art.

SUMMARY

In one aspect, the present disclosure is related to a slippage condition response system for a first machine of a plurality of machines. The slippage condition response system may include a sensing system configured to sense a parameter indicative of a slippage condition of the first machine. Additionally, the slippage condition response system may include a locator configured to sense a parameter indicative of a location of the first machine. The slippage condition response system may also include a transmitter. In addition, the slippage condition response system may include a controller, which may be in communication with the sensing system, the locator, and the transmitter. The controller may be configured to monitor the location of the first machine. The controller may also be configured to monitor the parameter indicative of a slippage condition of the first machine. Additionally, the controller may be configured to transmit to an offboard system at least one location where the first machine experienced a slippage condition.

In another aspect, the present disclosure is related to a method of operating a worksite. The method may include monitoring a location of a first machine of a plurality of machines. The method may also include monitoring a parameter indicative of a slippage condition of the first machine. Additionally, the method may include transmitting to an offboard system at least one location where the first machine experienced a slippage condition.

DETAILED DESCRIPTION

Figure 1:
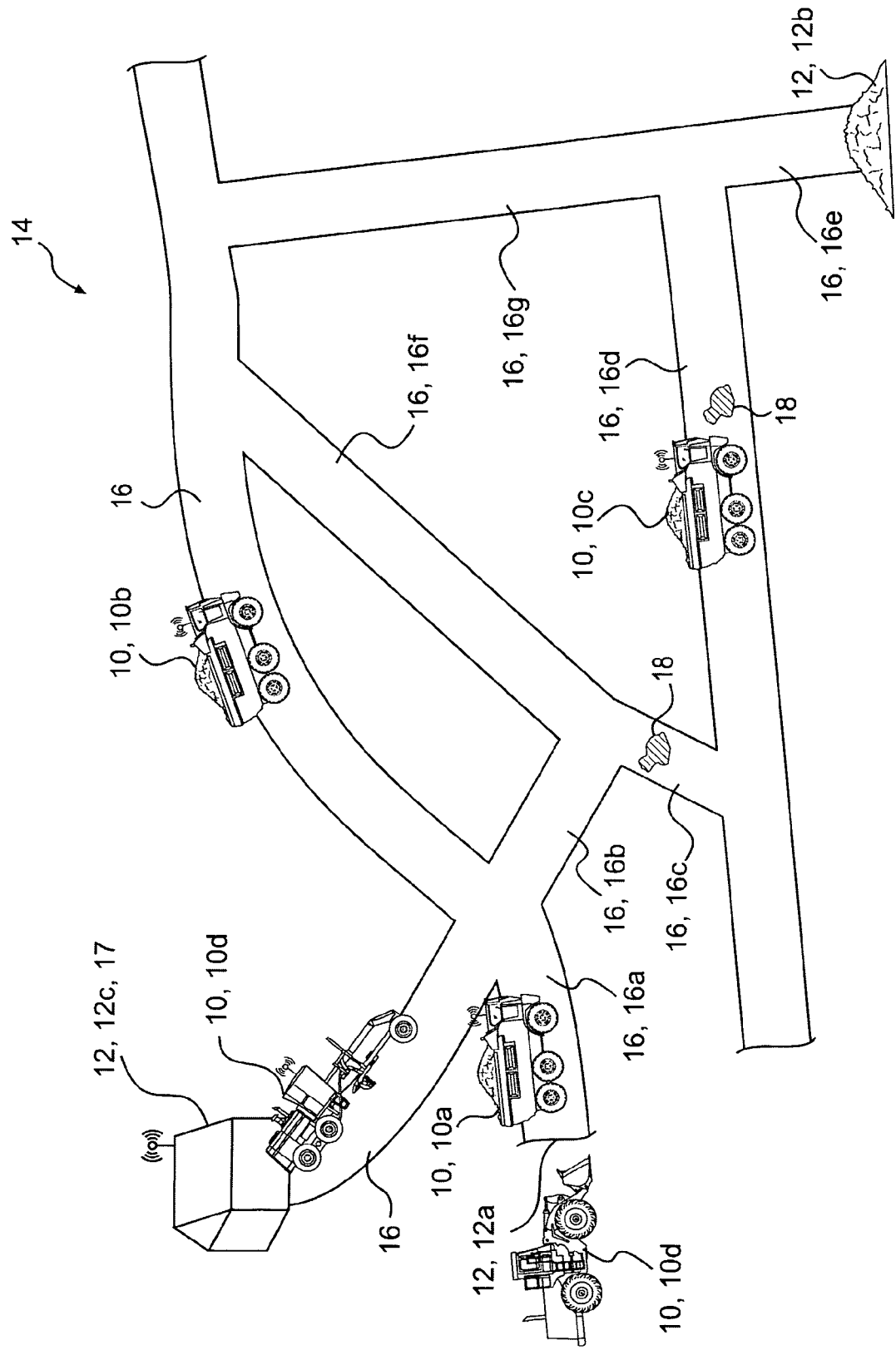
FIG. 1 is a pictorial illustration of exemplary disclosed machines at an exemplary disclosed worksite.

FIG. 1 illustrates exemplary machines 10, which may travel between locations 12 of a worksite 14 via paths 16. Machines 10 may be autonomous, semi-autonomous, and/or manned mobile machines that perform some type of operation associated with an industry such as mining, construction, farming, freighting, or another industry. Although autonomous machines 10 may be designed to operate without an operator, it should be understood that semi-autonomous machines 10 may or may not be designed to operate with an operator. In any case, each of a machine 10a, a machine 10b, and a machine 10c may be, for example, an on or off-highway haul truck, or another type of equipment, which may haul a load material. And, a machine 10d may be a motor grader, an excavator, a dozer, a water truck, or another type of equipment, which may repair paths 16. Alternatively, machines 10 may be, for example, loaders, compactors, scrapers, passenger vehicles, or other types of mobile machines.

Worksite 14 may be, for example, a mine site, a landfill, a quarry, a construction site, a ski resort, a logging site, a road worksite, or another type of worksite known in the art. Locations 12 may include buildings, dig sites, aggregate collection sites, or other locations from or to which machines 10 may travel. For example, a location 12*a* may be a dig site, a location 12*b* may be an aggregate collection site, and a location 12*c* may be a worksite control facility. Location 12*c* may hereafter be referred to as worksite control facility 17. Paths 16 may or may not include roadways that machine 10 regularly traverses. For example, paths 16 may be gravel roads, quarry floors, concrete bridges, or other types of paths that machines 10 may traverse.

As previously discussed, machines 10 may travel between locations 12 via paths 16. For example, machines 10 may travel from location 12*a* to location 12*b* via paths 16*a*, 16*b*, 16*c*, 16*d*, and 16*e*. Alternatively, machines 10 may travel from location 12*a* to location 12*b* via paths 16*a*, 16*b*, 16*f*, 16*g*, and 16*e*. It is contemplated that roadways of some paths 16 may at times be rendered unpredictable by for example, weather conditions, usage patterns, machine load losses, natural disasters, tectonic shifts, mud slides, rock slides, and/or other deteriorative events and/or processes. These roadways may include unpredictable portions, which may increase time and/or costs associated with traveling between locations 12. Additionally, the unpredictable portions may disable machines 10 by, for example, causing machines 10 to slip, get stuck, deplete their energy (e.g., fuel or electric charge), or crash. As illustrated in FIG. 1, some of the unpredictable portions of paths 16 may include slippage condition portions 18, which may cause machines 10 to experience slippage conditions. Each slippage condition of one of machines 10 (hereafter "machine 10") may or may not affect a heading and/or location of machine 10. For example, the slippage condition may cause machine 10 to fishtail, irregularly accelerate (accelerate slower than expected), or irregularly decelerate (decelerate slower than expected). Alternatively or additionally, the slippage condition may cause one or more traction devices of machine 10 to rotate irregularly (faster or slower than expected). Therefore, each machine 10 may include a slippage condition response system 30 to minimize the effect of slippage condition portions 18.

Figure 2:
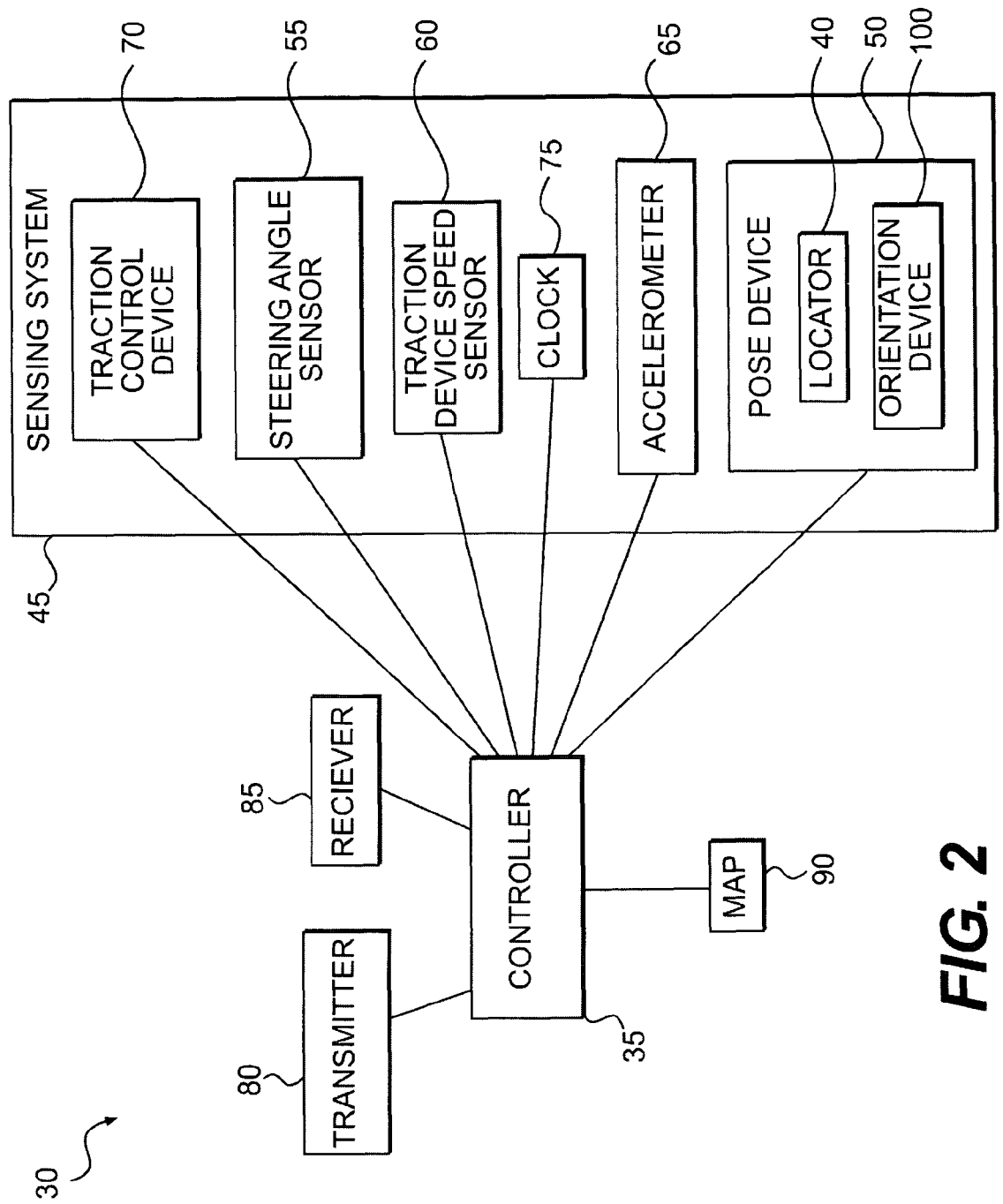
FIG. 2 is a diagrammatic illustration of an exemplary disclosed slippage condition response system for one of the machines of FIG. 1.

As illustrated in FIG. 2, each slippage condition response system 30 (hereafter "slippage condition response system 30") may have a controller 35, which may include one or more processors (not shown) and one or more memory devices (not shown). Controller 35 may communicate with a locator 40 to monitor a location of machine 10. Controller 35 may also communicate with sensors of a sensing system 45 to monitor parameters indicative of a slippage condition of machine 10. The sensors of sensing system 45 may be configured to sense these parameters. For example, the sensors of sensing system 45 may include a pose device 50 (a device for determining a location and an orientation), a steering angle sensor 55, a traction device speed sensor 60, an accelerometer 65, a traction control device 70, and/or a clock 75. In some embodiments, locator 40 may be included in pose device 50. Based on the communications with locator 40 and/or the sensors of sensing system 45, controller 35 may communicate with a transmitter 80 to transmit to an offboard system at least one location where machine 10 experienced a slippage condition. For example, the offboard system may include worksite control facility 17 and/or another machine 10.

In some embodiments, controller 35 may also communicate with a receiver 85 to receive from the offboard system at least one location where at least one of machines 10 experienced a slippage condition (hereafter a "known slippage condition location"). For example, the known slippage condition location may be a location where machine 10 experienced a slippage condition. Alternatively, the known slippage condition location may be a location where another machine 10 experienced a slippage condition. In either case, controller 35 may communicate with a map 90 to store the known slippage condition location. Based on communications with locator 40 and map 90, controller 35 may react to known slippage condition locations. For example, controller 35 may warn an operator of machine 10 of known slippage condition locations. Alternatively or additionally, controller 35 may autonomously control machine 10 and/or arrange for cleanup and/or repair of known slippage condition locations. For example, controller 35 may re-route machine 10 along another path 16. Alternatively, controller 35 may adjust a speed of machine 10. In yet another alternative, controller 35 may adjust a steering angle of machine 10. Alternatively, controller 35 may manipulate a work implement of machine 10; adjust the functioning of an object detection system, a stability control system, or another system of machine 10; or otherwise control machine 10. In yet another alternative, controller 35 may control multiple machines 10 to operate in tandem. For example, controller 35 may control a first machine 10 to pull or push a second machine 10 through a known slippage condition location.

Figure 3:
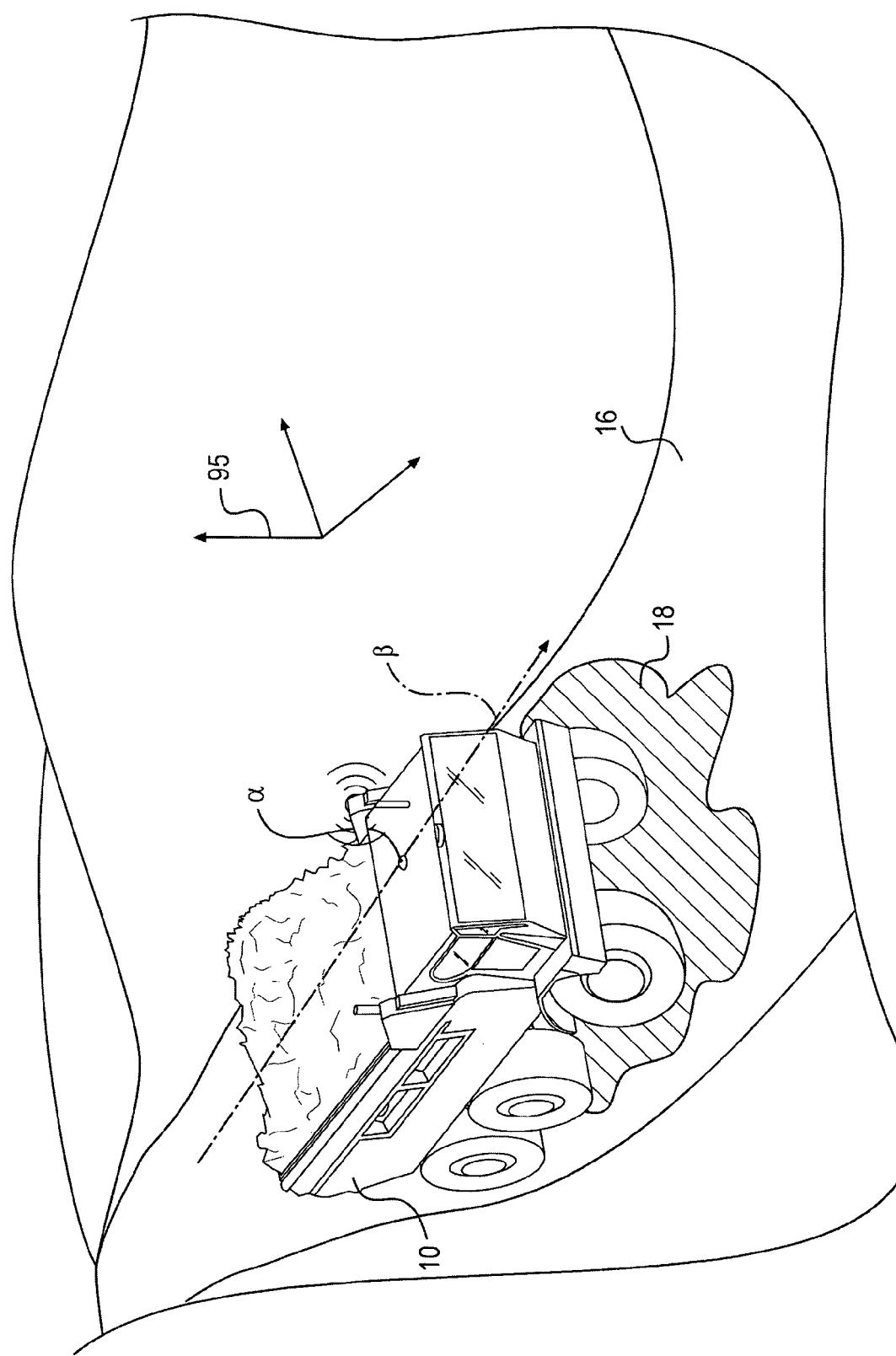
FIG. 3 is a pictorial illustration of one of the machines of FIG. 1 experiencing an exemplary disclosed slippage condition.

Pose device 50 may determine a location and an orientation of machine 10 relative to a local reference point, a coordinate system associated with worksite 14, a coordinate system associated with Earth, or another type of fixed coordinate system. For example, pose device 50 may determine the location and orientation of machine 10 relative to a fixed coordinate system 95, as illustrated in FIG. 3. Pose device 50 may include locator 40 (referring to FIG. 2) to determine the location of machine 10 and an orientation device 100 (referring to FIG. 2) to determine the orientation of machine 10.

Locator 40 may receive and analyze high-frequency, low power radio or laser signals from multiple locations to triangulate a relative location. For example, locator 40 may include an electronic receiver configured to communicate with one or more satellites, or a local radio or laser transmitting system to determine a relative 3-D location of machine 10. Alternatively or additionally, locator 40 may include an Inertial Reference Unit (IRU), odometric or dead-reckoning positioning device, or another known locating device operable to receive or determine a relative 3-D location of machine 10. Locator 40 may generate and communicate to controller 35 a signal indicative of the location of machine 10 in coordinate system 95 (hereafter the "location of machine 10"). As illustrated in FIG. 3, the location of machine 10 may be a machine location $\alpha$.

Orientation device 100 may include laser-level sensors, tilt sensors, inclinometers, or other known devices operable to determine a relative pitch and/or a relative roll of machine 10. Orientation device 100 may also include a radio direction finder, a gyrocompass, a fluxgate compass, or another known device operable to determine a relative yaw of machine 10. Orientation device 100 may generate and communicate to controller 35 a signal indicative of a heading of machine 10 with respect to coordinate system 95 (hereafter the "heading of machine 10"). As illustrated in FIG. 3, the heading of machine 10 may be a heading $\beta$, which may have a direction corresponding to a combination of the pitch and the yaw of machine 10 with respect to coordinate system 95.

Steering angle sensor 55 may determine a steering angle of machine 10. This steering angle may be measured with respect to heading $\beta$. Steering angle sensor 55 may generate and communicate to controller 35 a signal indicative of the determined steering angle with respect to heading β (hereafter the "steering angle of machine 10").

Traction device speed sensor 60 may determine speeds of one or more traction devices of machine 10 (hereafter the "traction device speed of machine 10"). For example, the one or more traction devices may be in the form of tracks or wheels. Traction device speed sensor 60 may generate and communicate to controller 35 a signal indicative of the determined traction device speed of machine 10.

Accelerometer 65 may determine an acceleration of machine 10 with respect to coordinate system 95. Accelerometer 65 may generate and communicate to controller 35 a signal indicative of the determined acceleration of machine 10.

Traction control device 70 may modify an amount of braking power supplied to each traction device of machine 10 to enhance traction and help reduce the effect of slippage condition portions 18. Traction control device 70 may also modify an amount of driving power supplied to each traction device of machine 10 to enhance traction and help reduce the effect of slippage condition portions 18. To maintain a certain minimum amount of traction, traction control device 70 may supply a certain amount of braking power and/or driving power. Traction control device 70 may generate and communicate to controller 35 a signal indicative of this certain amount of braking power and/or driving power.

Clock 75 may periodically communicate a signal indicative of a time to other slippage condition response system 30 components. These components may append the time to information communicated to controller 35. Controller 35 may use the appended time to synchronize received information from several components. For example, controller 35 may synchronize by time the steering angle of machine 10 with the traction device speed of machine 10.

Transmitter 80 may transmit, through a communications link, signals to worksite control facility 17, another machine 10, or another offboard system. Transmitter 80 may include hardware and/or software that enables transmitter 80 to transmit the signals through the communications link. The signals may include satellite, cellular, infrared, radio, and/or other types of wireless communication that enable transmitter 80 to transmit the signals to offboard systems. Alternatively, the signals may include electrical, optical, and/or other types of wired communication that enable transmitter 80 to transmit the signals to offboard systems.

Receiver 85 may receive, through a communications link, signals from worksite control facility 17, another machine 10, or another offboard system. Receiver 85 may include hardware and/or software that enables receiver 85 to receive the signals through the communications link. The signals may include satellite, cellular, infrared, radio, and/or other types of wireless communication that enable receiver 85 to receive the signals from offboard systems. Alternatively, the signals may include electrical, optical, and/or other types of wired communication that enable receiver 85 to receive the signals from offboard systems. The signals may be indicative of known slippage condition locations. Receiver 85 may generate and communicate to controller 35 a signal indicative of these known slippage condition locations.

Map 90 may be electronic in form and may be stored in the memory of controller 35, a memory of another machine 10, and/or a memory of worksite control facility 17. Map 90 may serve as a repository for known slippage condition locations. In other words, known slippage condition locations may be stored in map 90. It is contemplated that map 90 may be updated by controller 35, a controller of another machine 10, a controller of worksite control facility 17, or another component capable of updating map 90. This updating may be direct or by way of communications between one or machines 10 and/or worksite control facility 17. The updating may include adding known slippage condition locations to or removing known slippage condition locations from map 90.

Figure 4:
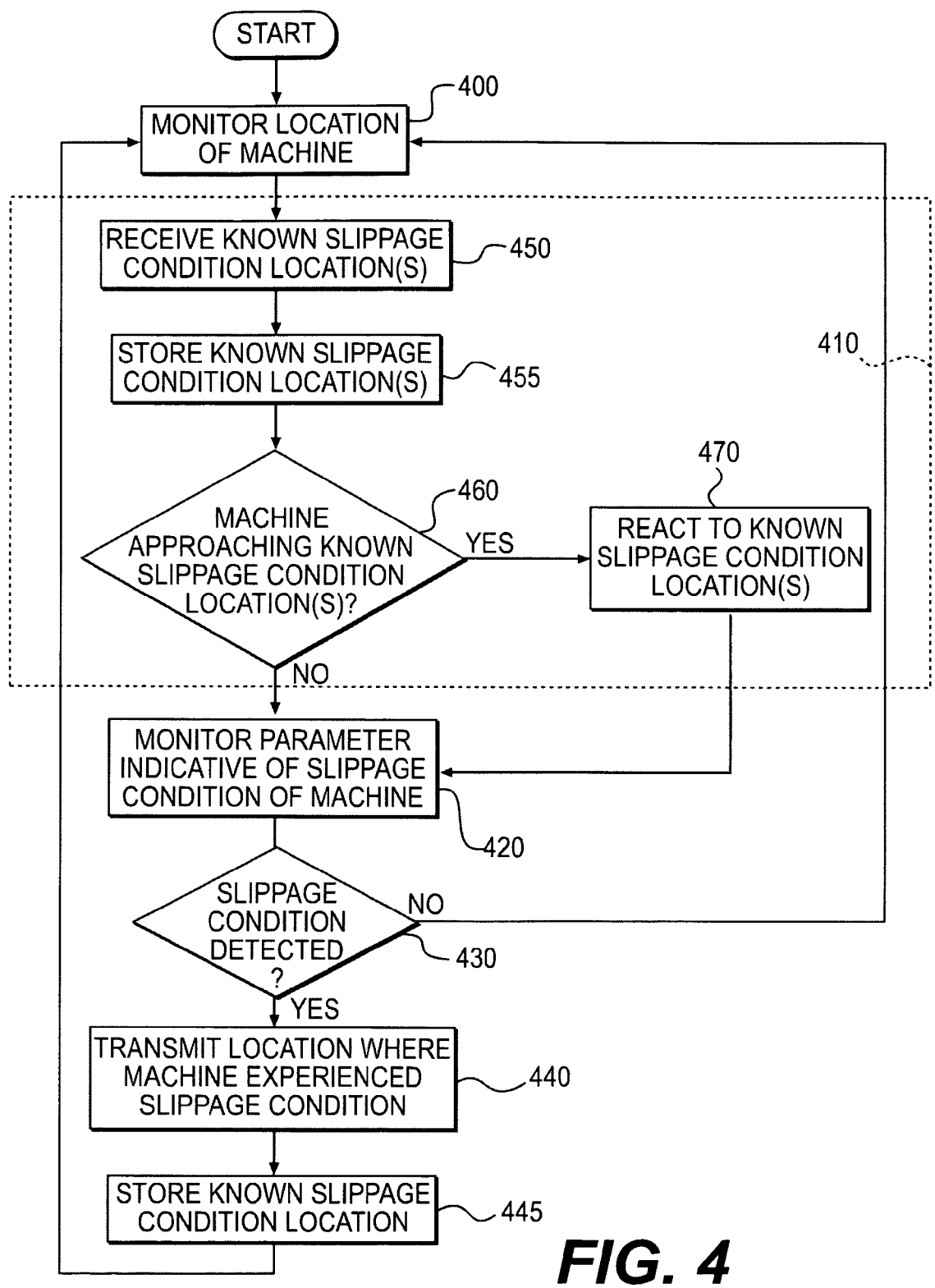
FIG. 4 is a flow chart describing an exemplary disclosed method of operating the slippage condition response system of FIG. 2.

FIG. 4 illustrates an exemplary method of operating slippage condition response system 30 to minimize the effect of slippage condition portions 18. FIG. 4 will be discussed in the following section to further illustrate slippage condition response system 30 and its operation.

INDUSTRIAL APPLICABILITY

The disclosed system may be applicable to a worksite having paths along which autonomous, semi-autonomous, and/or manned machines travel. The system may enable a plurality of the machines to collectively minimize the effect of slippage condition portions of the paths. In particular, the system may enable the plurality of machines to detect, share, and react to known slippage condition locations, which may correspond to slippage condition portions. Operation of the system at the worksite will now be described.

As illustrated in FIG. 4, slippage condition response system 30 (referring to FIG. 2), and more specifically, controller 35, may monitor with locator 40 the location of machine 10 (step 400). Controller 35 may then monitor and react to known slippage condition locations (step 410). Next, controller 35 may monitor a parameter indicative of a slippage condition of machine 10 (step 420). Controller 35 may then determine whether a slippage condition of machine 10 is detected (step 430). If a slippage condition is not detected, controller 35 may proceed back to step 400 and again monitor the location of machine 10. Otherwise, controller 35 may transmit to the offboard system the location where machine 10 experienced the detected slippage condition (step 440). Controller 35 may also store this location (a known slippage condition location) in map 90 (step 445). Alternatively, the offboard system may store the known slippage condition location in map 90. Controller 35 may then proceed back to step 400 and again monitor the location of machine 10.

The monitoring of and reaction to the known slippage condition locations (step 410) may include sub-steps. In particular, controller 35 may receive via receiver 85 one or more known slippage condition locations (sub-step 450). Controller 35 may store these known slippage condition locations in map 90 (sub-step 455). Controller 35 may then determine whether machine 10 is approaching any known slippage condition locations stored in map 90 (sub-step 460). For example, controller 35 may compare the location of machine 10 (monitored during step 400) to each known slippage condition location stored in map 90. If machine 10 is not approaching a known slippage condition location, controller 35 may proceed to step 420 and monitor a parameter indicative of a slippage condition of machine 10. Otherwise, controller 35 may react to the known slippage condition location(s) machine 10 is approaching (sub-step 470). For example, controller 35 may warn the operator of machine 10 of the known slippage condition location(s) machine 10 is approaching. This warning may be by way of an operator warning device (not shown). Alternatively or additionally, controller 35 may autonomously control machine 10, as previously discussed.

The monitoring of a parameter indicative of a slippage condition of machine 10 (step 420) may include monitoring one or more parameters sensed by the sensors of sensing system 45. Controller 35 may analyze these parameters to detect a slippage condition of machine 10. This analysis may vary according to how the slippage condition affects machine 10. It is contemplated that the analysis may detect a slippage condition that affects the heading and/or location of machine 10.

For example, controller 35 may analyze the location of machine 10 (sensed by locator 40) and the traction device speed of machine 10 (sensed by traction device speed sensor 60) to detect a slippage condition that affects the location of machine 10. In particular, controller 35 may receive from locator 40 a signal indicative of a location of machine 10 at a first time. Controller 35 may also receive from traction device speed sensor 60 a signal indicative of a traction device speed of machine 10 at the first time. Using methods known in the art of autonomous vehicles, controller 35 may predict a location of machine 10 at a second time based on the location of machine 10 at the first time and the traction device speed of machine 10 at the first time. Controller 35 may also receive from locator 40 a signal indicative of an actual location of machine 10 at the second time. Controller 35 may compare the predicted location of machine 10 at the second time to the actual location of machine 10 at the second time. Controller 35 may detect a slippage condition of machine 10 at the location of machine 10 at the first time if the predicted location of machine 10 at the second time is more than a threshold distance from the actual location of machine 10 at the second time. This threshold distance may be related to the type of worksite 14. For example, the threshold distance at a quarry may be greater than the threshold distance at a construction site. Alternatively or additionally, the threshold distance may be related to the type of machine 10. For example, the threshold distance for an off-highway haul truck may be greater than the threshold distance for an on-highway haul truck.

As another example, controller 35 may analyze the heading of machine 10 (sensed by orientation device 100), the steering angle of machine 10 (sensed by steering angle sensor 55), and the traction device speed of machine 10 (sensed by traction device speed sensor 60) to detect a slippage condition that affects the heading of machine 10. In particular, controller 35 may receive from orientation device 100 a signal indicative of a heading of machine 10 at a first time. Controller 35 may also receive from steering angle sensor 55 a signal indicative of a steering angle of machine 10 at the first time. Additionally, controller 35 may receive from traction device speed sensor 60 a signal indicative of a traction device speed of machine 10 at the first time. Using methods know in the art of autonomous vehicles, controller 35 may predict a heading of machine 10 at a second time based on the heading of machine 10 at the first time, the steering angle of machine 10 at the first time, and the traction device speed of machine 10 at the first time. Controller 35 may also receive from orientation device 100 a signal indicative of an actual heading of machine 10 at the second time. Controller 35 may compare the predicted heading of machine 10 at the second time to the actual heading of machine 10 at the second time. Controller 35 may detect a slippage condition of machine 10 at the location of machine 10 at the first time (sensed by locator 40) if the predicted heading of machine 10 at the second time differs by more than a threshold angle from the actual heading of machine 10 at the second time. This threshold angle may be related to the type of worksite 14. For example, the threshold angle at a quarry may be greater than the threshold angle at a construction site. Alternatively or additionally, the threshold angle may be related to the type of machine 10. For example, the threshold angle for an off-highway haul truck may be greater than the threshold angle for an on-highway haul truck.

Alternatively or additionally, the analysis may detect a slippage condition that causes one or more traction devices of machine 10 to rotate irregularly. For example, controller 35 may analyze the traction device speed of machine 10 (sensed by traction device speed sensor 60) and the acceleration of machine 10 (sensed by accelerometer 65) to detect a slippage condition that causes one or more traction devices of machine 10 to rotate irregularly. For example, traction devices in the form of wheels may rotate irregularly. Alternatively, sprockets associated with traction devices in the form of tracks may rotate irregularly. In particular, controller 35 may receive from traction device speed sensor 60 a signal indicative of a traction device speed of machine 10 at a first time. Controller 35 may also receive from accelerometer 65 a signal indicative of an acceleration of machine 10 between the first time and a second time. Using methods known in the art of autonomous vehicles, controller 35 may predict a traction device speed of machine 10 at the second time based on the traction device speed of machine 10 at the first time and the acceleration of machine 10 between the first time and the second time. Controller 35 may also receive from traction device speed sensor 60 a signal indicative of an actual traction device speed of machine 10 at the second time. Controller 35 may compare the predicted traction device speed of machine 10 at the second time to the actual traction device speed of machine 10 at the second time. Controller 35 may detect a slippage condition of machine 10 at the location of machine 10 at the first time (sensed by locator 40) if the predicted traction device speed of machine 10 differs by more than a threshold speed from the actual traction device speed of machine 10 at the second time. This threshold speed may be related to the type of worksite 14. For example, the threshold speed at a quarry may be greater than the threshold speed at a construction site. Alternatively or additionally, the threshold speed may be related to the type of machine 10. For example, the threshold speed for an off-highway haul truck may be greater than the threshold speed for an on-highway haul truck.

Controller 35 may alternatively detect a slippage condition of machine 10 by analyzing the amount of braking power and/or driving power supplied by traction control device 70. In particular, controller 35 may receive from traction control device 70 a signal indicative of an amount of braking power and/or driving power supplied by traction control device 70 at a first time. Controller 35 may detect a slippage condition of machine 10 at the location of machine 10 at the first time (sensed by locator 40) if the amount of braking power and/or driving power supplied by traction control device 70 exceeds a threshold amount of braking power and/or driving power. This threshold amount of braking power and/or driving power may be related to the type of worksite 14. For example, the threshold amount of braking power and/or driving power at a quarry may be greater than the threshold amount of braking power and/or driving power at a construction site. Alternatively or additionally, the threshold amount of braking power and/or driving power may be related to the type of machine 10. For example, the threshold amount of braking power and/or driving power for an off-highway haul truck may be greater than the threshold amount of braking power and/or driving power for an on-highway haul truck.

It is contemplated that each of a plurality of machines 10 at worksite 14 may include a slippage condition response system 30, each being operated in accordance with steps 400-445. These slippage condition response systems 30 may collectively minimize the effect of slippage condition portions 18 by increasing awareness of slippage condition portions 18. In particular, a slippage condition response system 30 of a first machine 10 may detect a slippage condition. Additionally, this slippage condition response system 30 may transmit a location where machine 10 experienced the detected slippage condition to a worksite control facility 17 and/or a second machine 10. This location (a known slippage condition location) may correspond to one of slippage condition portions 18.

Worksite control facility 17 may receive the known slippage condition location. Additionally, worksite control facility 17 may store the known slippage condition location in a map 90 of worksite control facility 17. Next, worksite control facility 17 may arrange for cleanup and/or repair of the known slippage condition location. Once the known slippage condition location is cleaned up and/or repaired, worksite control facility 17 may remove the known slippage condition location from the map 90 of worksite control facility 17. It is also contemplated that worksite control facility 17 may periodically transmit the map 90 of worksite control facility 17 to machines 10. In doing so, worksite control facility 17 may transmit known slippage condition locations to machines 10. These known slippage condition locations may not include known slippage condition locations that have been cleaned up and/or repaired.

A slippage condition response system 30 of the second machine 10 may receive the known slippage condition location(s) from the first machine 10 and/or worksite control facility 17. The slippage condition response system 30 of the second machine 10 may then store the known slippage condition location(s) in a map 90 of the slippage condition response system 30 of the second machine 10. As the second machine 10 approaches the known slippage condition location(s), the slippage condition response system 30 of the second machine 10 may react to the known slippage condition location(s). Specifically, the slippage condition response system 30 of the second machine 10 may warn an operator of the second machine 10 of the known slippage condition location(s) and/or autonomously control the second machine 10 in response to the known slippage condition location(s). In doing so, the slippage condition response system 30 of the second machine 10 may prevent the second machine 10 from re-traversing portions of paths 16. And, the slippage condition response system 30 of the second machine 10 may prevent the second machine 10 from being disabled by the known slippage condition location(s).

It will be apparent to those skilled in the art that various modifications and variations can be made to the methods and systems of the present disclosure. Other embodiments of the methods and systems will be apparent to those skilled in the art from consideration of the specification and practice of the methods and systems disclosed herein. It is intended that the specification and examples be considered as exemplary only, with a true scope of the disclosure being indicated by the following claims and their equivalents.

What is claimed is:

1. A method of operating a worksite, the method comprising:
    monitoring a location of a first haul truck of a plurality of haul trucks located at a worksite;
    monitoring a parameter indicative of a slippage condition of the first haul truck;
    transmitting to an offboard system at least one location where the first haul truck experienced a slippage condition; and
    dispatching a machine to repair the at least one slippage location at the worksite.

2. The method of claim 1, further including storing in a map at least one known slippage condition location where at least one of the plurality of haul trucks experienced a slippage condition.

3. The method of claim 1, wherein transmitting to the offboard system includes transmitting to a second machine of the plurality of haul trucks.

4. The method of claim 1, wherein transmitting to the offboard system includes transmitting to a worksite control facility.

5. The method of claim 1, further including:
    receiving from the offboard system at least one known slippage condition location where at least one of the plurality of haul trucks experienced a slippage condition; and
    autonomously controlling the first haul truck based on the at least one known slippage condition location.

6. The method of claim 5, wherein autonomously controlling the first haul truck includes re-routing the first haul truck.

7. The method of claim 1, further including:
    receiving from the offboard system at least one known slippage condition location where at least one of the plurality of haul trucks experienced a slippage condition; and
    warning an operator of the first haul truck of the at least one known slippage condition location.

8. A slippage condition response system for a first machine of a plurality of machines, the slippage condition response system comprising:
    a sensing system configured to sense a parameter indicative of a slippage condition of the first machine;
    a locator configured to sense a parameter indicative of a location of the first machine;
    a transmitter;
    a receiver;
    a map; and
    a controller in communication with the sensing system, the locator, the transmitter, the receiver, and the map, the controller being configured to:
    monitor the location of the first machine;
    monitor the parameter indicative of a slippage condition of the first machine;
    transmit to an offboard system at least one location where the first machine experienced a slippage condition;
    receive from the offboard system at least one known slippage condition location where at least one of the plurality of machines experienced a slippage condition;
    store in the map the at least one known slippage condition location; and
    autonomously control the first machine based on the at least one known slippage condition location.

9. The slippage condition response system of claim 8, wherein the locator is included in the sensing system.

10. The slippage condition response system of claim 8, wherein the controller is further configured to warn an operator of the first machine of the at least one known slippage condition location.

11. The slippage condition response system of claim 8, wherein the offboard system includes a worksite control facility.

12. The slippage condition response system of claim 8, wherein the offboard system includes a second machine of the plurality of machines.

13. A method of operating a worksite, the method comprising:
    monitoring a location of a first machine of a plurality of machines;
    monitoring a parameter indicative of a slippage condition of the first machine;

transmitting to an offboard system at least one location where the first machine experienced a slippage condition;

receiving from the offboard system at least one known slippage condition location where at least one of the plurality of machines experienced a slippage condition;

storing in a map the at least one known slippage condition location; and autonomously controlling the first machine based on the at least one known slippage condition location.

14. The method of claim 13, wherein autonomously controlling the first machine includes re-routing the first machine.

15. The method of claim 13, further including autonomously controlling a second machine of the plurality of machines based on the at least one known slippage condition location.

16. The method of claim 13, further including warning an operator of the first machine of the at least one known slippage condition location.

17. The method of claim 13, wherein transmitting to the offboard system includes transmitting to a second machine of the plurality of machines.

18. The method of claim 13, wherein transmitting to the offboard system includes transmitting to a worksite control facility.

* * * * *